Oct. 18, 1938.   H. F. WATERS   2,133,494
WIRELESSLY ENERGIZED ELECTRICAL APPLIANCE
Filed Oct. 24, 1936   2 Sheets-Sheet 1

INVENTOR.
Harry F Waters
BY
ATTORNEY.

Oct. 18, 1938.   H. F. WATERS   2,133,494
WIRELESSLY ENERGIZED ELECTRICAL APPLIANCE
Filed Oct. 24, 1936    2 Sheets-Sheet 2
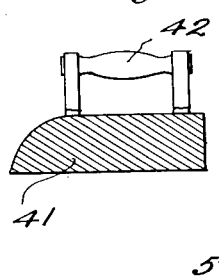
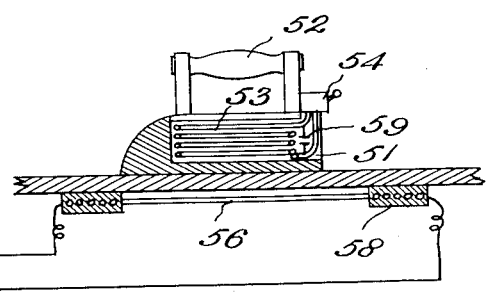
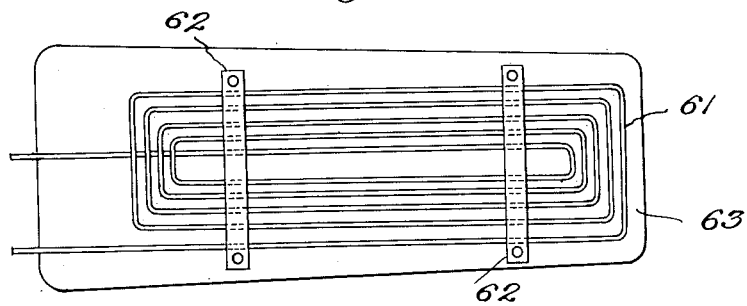
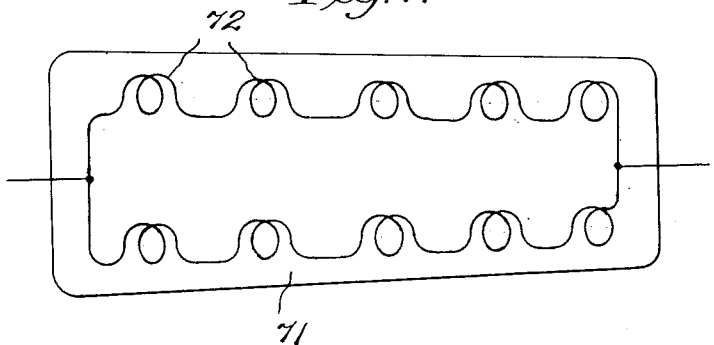
INVENTOR.
Harry F. Waters
BY
ATTORNEY.

Patented Oct. 18, 1938

2,133,494

UNITED STATES PATENT OFFICE 2,133,494

WIRELESSLY ENERGIZED ELECTRICAL APPLIANCE

Harry F. Waters, New York, N. Y.

Application October 24, 1936, Serial No. 107,375

5 Claims. (Cl. 219—25)

The present invention relates to electrical appliances, and, more particularly, to electrical appliances such as cooking utensils, percolators, water heaters, toasters, flatirons, mixers, table lamps, and the like, which may be energized and operated without requiring any wire connection between the appliance and a source of electrical power or energy.

It is an object of the present invention to provide electrical appliances of novel and improved character which in combination with an energy radiating means may be energized and supplied with electrical energy without requiring any wire connection between the energy radiating or transmitting means and the appliance.

It is another object of the present invention to provide a system of transmitting electrical power without wire connection between the source of electrical power and the load, in which system a substantial percentage of the transmitted energy is utilized and in which the losses are relatively small.

It is a further object of the present invention to provide novel energy transmitting and receiving means for wirelessly operating small appliances using electrical power such as small table lamps, percolators, toasters, flatirons, and the like.

The invention also contemplates the provision of an efficient and foolproof energy transmission system and apparatus for wirelessly operating small electrical appliances which is simple in construction and to operate, and which may be manufactured and sold at a relatively low price on a practical and commercial scale.

Other and further objects and advantages of the present invention will become apparent from the following description taken in conjunction with the accompanying drawings, in which:—

Fig. 4 is a side elevational view of a flatiron adapted to be operated without any wire connection in an alternating field of electrical energy;

Fig. 5 is a vertical sectional view of a flatiron of modified construction capable of being actuated in a high frequency field without requiring a wire connection;

Fig. 6 illustrates a special ironing board which is to be employed in connection with the flatirons illustrated in Figs. 4 and 5; and Fig. 7 depicts a further modified embodiment of a special ironing board provided for the same purpose.

Figure 1:
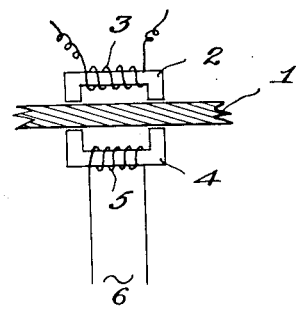
Fig. 1 illustrates a diagrammatic view, somewhat fragmentary, of an exemplary embodiment of the present invention.

Broadly stated, according to the principles of the present invention an electromagnetic field of alternating character is provided. Although it has been found that this field is preferably of a high frequency character and has a frequency from about 100,000 up to several millions of oscillations per second; in some cases very satisfactory results may be obtained by employing alternating currents and fields having industrial frequencies such as, for example, 60 oscillations per second or even less. The electrical appliance to be actuated without wire connection is arranged in said field and is provided with suitable pick-up devices capable of picking up at least part of the said radiated electrical energy. This may be accomplished, for example, by the provision of inductive or of capacitive coupling between the energy radiating or transmitting device and the operated or receiving appliance. Preferably, the appliance to be operated is provided with a pick up coil of relatively large surface which if located in the said electrical field of alternating character will have an electro-motive force induced therein. This electro-motive force may be considerably increased by maintaining resonant conditions between the frequency of the transmitted electrical energy and the natural frequency of the electrical system or circuit within the energy receiving appliance. Thus, excellent results are obtained by providing a coil and a condenser within the electrical appliance and by so adjusting the inductance of the coil and the capacity of the condenser that the natural frequency of the system is identical with that of the transmitted energy. In this case the effective impedance of the pick up circuit will be the smallest and the proportion between the transmitted energy and the received and utilized energy the most favorable. The energy picked up in the electrical appliance may be utilized in any desired way, for example, for the purpose of heating, cooking, toasting, operating a small electric motor, lighting up a lamp, operating a flatiron, and the like, as those skilled in the art will readily understand. In case only the heating effect of the received current is utilized, it is generally unnecessary to provide a tuned electrical circuit within the wirelessly operated electrical appliance in view of the fact that the metal mass of the appliance proper may be directly heated by means of the eddy currents produced therein when the said appliance is introduced into an alternating electrical field.

The maximum distance between the transmitter of alternating electrical energy and the receiving electrical appliance which is to be operated wirelessly, is essentially determined by the intensity of the field and by the frequency of the alternating currents employed. Of course, the greater the distance, the smaller is the current induced in the circuit of the electrical appliance and the more electrical energy has to be transmitted in order to obtain the desired amount of electrical energy required for the correct operation of the electrical appliance. Generally speaking, relatively short distances and high frequencies are to be employed in order to keep the transmission losses within practical limits.

Various sources of alternating or high frequency currents may be employed according to the distance of transmission, the amount of energy required in the appliance and to other similar considerations. In some cases the low frequency alternating currents of conventional power lines having a frequency of about 25 to 60 may be directly employed and introduced into a transmitting coil of suitable dimensions. In this case, however, the amount of energy to be transmitted is necessarily very restricted and only very small distances of transmission may be accomplished such as, for example, transmitting the energy through the thickness of a table, or wall, or the like. Greater amounts of energy are obtained by converting the current of the power line into an electrical oscillation of high frequency. Of course, a great variety of oscillation producers are capable of being used for this purpose such as quenched spark transmitters, thermionic tube oscillators, frequency doubling and multiplying circuits, and the like. Preferably, high or radio frequencies of such character are employed which are outside of the frequency band of broadcasting wavelengths so that no interference with radio reception is caused in proximity of the wireless energy transmitting system. The invention will now be more fully described to those skilled in the art, reference being had to the accompanying drawings.

Referring now more particularly to Fig. 1 of the drawings, a simple and efficient system for the wireless transmission of electrical energy through a table, or board, is illustrated. The system essentially comprises a transformer having a primary winding 5 and a secondary winding 3 arranged underneath and above a board or table 1, respectively. Winding 5 is provided with an iron core 4, while winding 3 is provided with an iron core 2 of similar dimensions. When primary winding 5 is connected to a source of alternating current 6, for example to a current of industrial frequency, the magnetic force lines set up by winding 5 in the iron core 4 will permeate the table 1 to a certain extent and will energize iron core 2 and winding 3. Thereby an alternating electro-motive force will be induced in secondary winding 3, which may be employed for connecting an electrical appliance thereto, such as a small lamp, a toaster, or the like. Of course, the primary and the secondary portion of the wireless energy transmitting system, in other words the energy transmitter and the energy receiver have to be at a very short distance and they have to be in a substantially registering position in order to be able to transmit the desired amount of electrical energy. Moreover, it is necessary that the board or table 1 should be made of a poor electrical conductor, such as wood, or of a dielectric, because a metal plate would not only shield the inductive effect to some extent but in addition the greater part of the energy would be lost through eddy currents produced in the metal mass.

Figure 2:
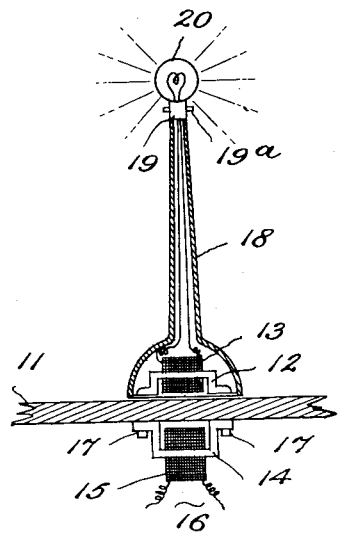
Fig. 2 depicts a vertical sectional view, also fragmentary, of a modified embodiment of the present invention into a portable table lamp.

Fig. 2 illustrates a modified embodiment of the invention in which a portable table lamp is operated wirelessly. On the under surface of a table 11 is mounted the energy transmitter comprising an iron core 14 and a primary winding 15. Iron core 14 is so shaped that it may be readily attached permanently to the under surface of the table by means of screws or bolts 17. Above the table surface is provided the energy receiver essentially comprising an iron core 12 similar to iron core 14 and bearing a secondary winding or coil 13. The energy receiver is completely enclosed in a stand or lamp casing 18 preferably constituted of a dielectric, such as wood or an artificial resin. A lamp socket 19 having a switch 19a therein and holding a small electric lamp 20 is mounted at the upper end of stand 18 and is electrically connected to secondary winding 13.

From the preceding description the operation of this modified embodiment will be readily understood by those skilled in the art. When primary winding 15 of the energy transmitter is connected to a source of alternating current 16, an alternating electro-motive force will be induced in the secondary winding 13, even though they are separated by the table 11. This electro-motive force will cause a current to flow in the circuit associated with the secondary winding and will light up lamp 20. In view of the fact that there is no electrical connection between the primary and the secondary windings, the lampstand and the lamp may be lifted up from the table and thus the lamp may be extinguished without requiring disconnection of any wire connections. Of course, a conventional switch may be provided in either the primary or in the secondary circuit, if desired. Generally speaking, it is not necessary to disconnect the primary winding at any time so long as the secondary winding is interrupted or the complete lamp is removed from the table since the inductance of the primary winding is high enough to prevent any substantial currents to flow through the primary or energy transmitting circuit when the secondary circuit is inoperative. Of course, the amount of energy which can be transmitted by means of this arrangement is limited, but it is amply sufficient to light up moderate-sized lamps or to operate other small electrical appliances. The amount of energy transmitted from the primary circuit into the secondary circuit is the greatest when the primary iron core is the closest to the secondary iron core. By displacing the two cores one from the other it is easily possible to provide a simple and efficient control of the current induced in the secondary or energy receiving circuit.

Figure 3:
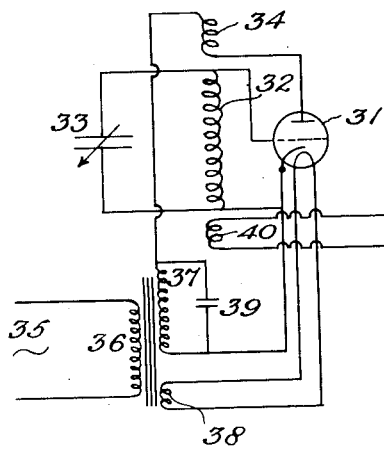
Fig. 3 shows a further modified embodiment of the invention into a portable table lamp associated with a generator of high frequency electrical energy.
Figure 3:
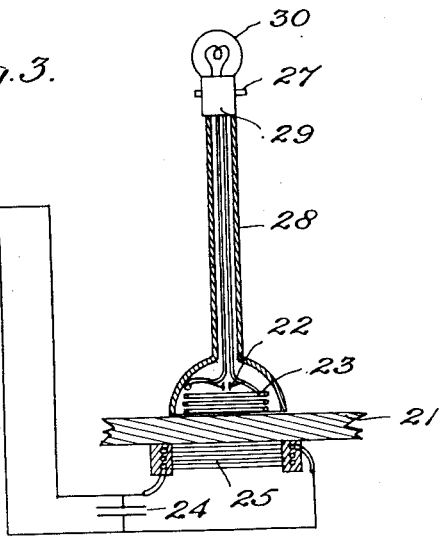

In case it is desired to transmit greater amounts of electrical energy, the arrangement illustrated in Fig. 3 is recommended. This arrangement comprises a source of high frequency oscillations capable of converting a direct current or an alternating current of industrial frequency into high frequency oscillations. The oscillation producer consists of a three electrode thermionic tube 31 having a plate, a grid and an indirectly heated cathode. In the illustrated form of the oscillator, a power transformer having a primary winding 36 and two secondary windings 37 and 38 is provided for supplying the plate and the filament voltage, respectively, for the oscillator tube 31. The oscillator circuit consists of a tuned circuit constituted of an inductance 32 and a variable condenser 33 connected in the conventional manner between the filament and the grid of oscillator tube 31. A conventional feed back coil 34 is connected in the plate circuit of the tube and in series with winding 37 of the power transformer supplying the anode voltage. A small by-pass condenser 39 is shunted across winding 37 in order to permit the passage of high frequency currents. As those skilled in the art know, a circuit of the described character is capable of producing high frequency oscillations, the frequency of which is determined by the electrical constants of the tuned circuit 32, 33. The oscillator is supplied with electrical energy by connecting primary winding 36 of the power transformer to a source of industrial alternating current 35. The high frequency oscillations produced by the oscillator may be picked up by means of a small coil 40 loosely coupled to the tuned circuit 32, 33 and may be utilized for the purposes of energy transmission as it will be described more fully hereinafter.

It will be noted that no rectifier has been provided in the oscillation producer in view of the fact that the tube 31 will permit the passage of current only during every half wave while during the second half of the wave the oscillator will be inoperative. This is generally permissible for the transmission of electrical energy, in view of the fact that no absolute continuity of the current transmission is required. Thus, the illustrated oscillator produces an intermittent high frequency current which is interrupted and modulated by the frequency of the source of alternating current, 35. This arrangement is simple and inexpensive inasmuch as no rectifier and filter circuits are necessary but, if desired, rectifier and filter circuits of conventional character may be employed whereby the high frequency energy produced and transmitted is increased and at the same time the danger of interference with broadcasting receivers is considerably lessened.

The right side of Fig. 3 illustrates an arrangement much similar to those illustrated in Figs. 1 and 2. An energy transmitting coil 25 is secured to the under surface of a board or table 21 and is connected to the source of the high frequency energy. Above the table surface is provided a lamp stand 28 preferably constituted of an insulating material. In the lower or bottom portion of the lampstand is provided the energy receiving or pick up coil 23 which is constituted of a few turns of thick stranded wire. To the ends of this energy receiving coil is connected the load which in the illustrated case is a small electric bulb 30 inserted into socket 29 and operable by means of a switch 27. Of course, the high frequency field of energized coil 25 will be amply sufficient to induce an electro-motive force of high frequency in the secondary or energy receiving coil 23, and bulb 30 will be brought to incandescence when switch 27 is closed. Obviously, the lamp may be made inoperative simply by picking up the lampstand and removing it from the table or by moving it horizontally on the table to a sufficient distance from the primary winding. In order to obtain the best and most economical transmission of energy it has been found to be advantageous to employ resonant conditions in both the energy transmitting and receiving circuits. Thus, a condenser 24 and a condenser 22 of suitable size may be provided in the transmitting and receiving circuits, respectively, to tune the same to the frequency of the high frequency energy supplied thereto whereby the losses in the system are reduced to a minimum. It is also to be noted that it is unnecessary and, as a matter of fact, undesirable to provide an iron core or any other iron or metal masses in proximity of the coils carrying high frequency, because otherwise great losses of energy will be caused by the eddy currents set up in such conducting masses.

In case only the heat effect of the high frequency currents is to be utilized, it is not necessary to provide a pick up winding in the energy receiving part of the appliance. It is generally sufficient to provide a substantial metal mass, such as copper or iron, in which eddy currents will be induced and will cause a raise in the temperature thereof. This type of arrangement is illustrated in Fig. 4 in which a flatiron is shown adapted to be wirelessly operated in a high frequency field. The flatiron consists only of a metal body 41 and of a handle 42. If this flatiron is placed on a table underneath which a high frequency coil is provided and establishes a high frequency field, eddy currents of considerable intensity will be produced in the metal mass thereof and will heat up the same. Of course, the same simple principle may be employed for operating small cooking utensils, toasters, and similar appliances.

The type of wirelessly operated electric flatiron shown in Fig. 4, although very simple and efficient, has the disadvantage that the amount of energy converted to heat is not capable of control unless by controlling the amount of energy transmitted or converted into high frequency oscillations. Moreover, it will be difficult to maintain the temperature between the desired limits necessary, for example, for ironing delicate fabrics. An improved control of heat and of operation is provided by means of the flatiron illustrated in Fig. 5. This flatiron essentially comprises a body member 51 and a handle 52. In view of the fact that in this embodiment it is not relied upon the eddy currents for the heating effect, it is preferred to limit or to completely eliminate the presence of eddy currents. For this reason, body 51 of the flatiron is preferably constituted of laminated metal or of a dielectric, such as porcelain, in order to reduce or to completely eliminate these eddy currents. A coil 53 is provided within the body of the flatiron and is capable of picking up part of the oscillatory energy radiated by means of the primary coil 56 mounted underneath the table or ironing board 55 by means of insulators 58. Coil 56 is connected to a source of high frequency energy 57. Of course, in view of the fact that the flatiron has to be displaced along the surface of the table or ironing board during the ironing operation, it is desirable to provide a coil 56 of substantial size, the surface of which is covering all or most of the surface of the ironing board. A tuning condenser 59 may be connected across the pick up or energy receiving coil 53 with obvious results and the operation of the flatiron may be started or discontinued by means of a conventional switch 54.

Fig. 6 depicts a type of coil which is especially adapted for this type of operation in which the energy receiving appliance is to be displaced along a substantial surface. As it clearly appears from Fig. 6, a coil 61 consisting of a plurality of very long flat turns is provided and is mounted on the back surface of the table or ironing board 63 by means of insulators 62. The advantages of this arrangement for the purpose indicated are obvious. In some cases it is preferred to provide a plurality of small energy transmitting coils rather than one of very great extension. An arrangement of this type is illustrated in Fig. 7. On a board 71 of wood or of some other insulating material, a plurality of energy transmitting coils 72 is mounted. The coils may be combined in any desired manner, for example, in parallel or series or in parallel-series, in order to match the resulting inductance with the frequency of the high frequency currents. If desired, condensers may be connected in various arrangements with some or all of the coils or with the totality of the coils to obtain preferred natural frequency of the system of coils. The operation of this modified embodiment will be readily understood by those skilled in the art without any further explanation.

Although the present invention has been described in connection with a few preferred embodiments thereof, variations and modifications may be resorted to by those skilled in the art without departing from the principles of the present invention. Thus, instead of lamps other electrical appliances such as small motors, toasters, percolators, and the like devices may be operated in similar manner. Various other forms of high frequency oscillation producers may be employed with equal or similar results, such as high frequency machines, frequency multiplying circuits, spark transmitters of the character employed in medical diathermy machines, short wave machines, and the like. I consider all of these variations and modifications as within the true spirit and scope of the present invention as disclosed in the present description and defined by the appended claims.

What is claimed is:—

1. A wirelessly operated electrical flatiron comprising an ironing board constituted of an insulating material of such size and shape that a normal ironing operation may be carried out upon the same, an energy transmitting coil mounted on the underside of said board and substantially covering the complete surface thereof, means for supplying high frequency electrical energy to said coil, and a flatiron having a substantial metallic mass displaceable on the upper surface of said board and adapted to be heated by the eddy currents induced therein through the thickness of said board.

2. A wirelessly operated electrical flatiron comprising an ironing board constituted of an insulating material of such size and shape that a normal ironing operation may be carried out upon the same, an energy transmitting coil mounted on the lower side of said board and substantially covering the complete surface thereof, means for supplying high frequency electrical energy to said coil, a flatiron substantially free from contiguous metallic masses displaceable on the upper surface of said board, and a closed electrical circuit including a pick up coil incorporated in said flatiron and adapted to be heated by currents induced therein.

3. A wirelessly operated electrical flatiron comprising an ironing board constituted of an insulating material of such size and shape that a normal ironing operation may be carried out upon the same, an energy transmitting coil mounted on the lower side of said board and substantially covering the complete surface thereof, means for supplying high frequency electrical energy to said coil, a flatiron substantially free from contiguous metallic masses displaceable on the upper surface of said board, a closed electrical circuit including a pick up coil incorporated in said flatiron and adapted to be heated by currents induced therein, and turning means for said transmitting and pick up coils.

4. A wirelessly operated electrical flatiron comprising an ironing board constituted of an insulating material of such size and shape that a normal ironing operation may be carried out upon the same, a plurality of energy transmitting coils mounted on the under side of said board and uniformly distributed throughout the surface thereof, means for supplying high frequency electrical energy to said coils, a flatiron substantially free from contiguous metallic masses displaceable on the upper surface of said board, a closed electrical circuit including a pick up coil incorporated in said flatiron and adapted to be heated by currents induced therein, and tuning means for said transmitting and pick up coils.

5. In a wirelessly operated electrical ironing system including an ironing board of such size and shape that a normal ironing operation may be carried out upon the same and having high frequency energy radiating means associated therewith, a flatiron for said system, said flatiron comprising a body portion substantially free from large continuous metallic masses and being displaceable on the upper surface of said board, a closed electrical circuit including a pick up coil incorporated in said flatiron and adapted to be heated by the current induced therein, and tuning means for said closed electrical circuit.

HARRY F. WATERS.